(12) United States Patent
Mart

(10) Patent No.: US 6,794,609 B2
(45) Date of Patent: Sep. 21, 2004

(54) PROSTHETIC DEVICE FOR USE WITH TOUCH-SCREEN DISPLAYS

(75) Inventor: Loren Mart, Meridian, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 10/372,455

(22) Filed: Feb. 21, 2003

(65) Prior Publication Data

US 2004/0164065 A1 Aug. 26, 2004

(51) Int. Cl.[7] ................................................ H05B 3/00
(52) U.S. Cl. .................... 219/209; 219/201; 219/220; 219/535; 219/528; 219/221; 345/173; 345/179
(58) Field of Search ............................. 219/201, 535, 219/528, 549, 209, 530, 540, 221, 227, 229, 220; 345/173–174, 179

(56) References Cited

U.S. PATENT DOCUMENTS

| | | | |
|---|---|---|---|
| 1,573,693 A | | 2/1926 | Engstrom |
| 2,555,203 A | | 5/1951 | Ramsey |
| 2,625,643 A | * | 1/1953 | Cordis .......................... 219/535 |
| 3,689,937 A | | 9/1972 | Phillips et al. |
| 3,781,514 A | * | 12/1973 | Olson et al. ................. 219/211 |
| 3,955,063 A | | 5/1976 | Berger |
| 4,021,640 A | | 5/1977 | Gross et al. |
| 4,176,273 A | * | 11/1979 | Fujie et al. .................. 219/220 |
| 4,553,921 A | * | 11/1985 | Lamphere et al. ........... 425/279 |
| 4,598,192 A | * | 7/1986 | Garrett ........................ 219/201 |
| 4,713,535 A | | 12/1987 | Rhoades |
| 4,758,846 A | | 7/1988 | Watkins |
| 4,954,676 A | | 9/1990 | Rankin |
| 4,983,814 A | * | 1/1991 | Ohgushi et al. ............. 219/545 |
| 5,290,281 A | * | 3/1994 | Tschakaloff ................... 606/28 |
| 5,374,806 A | * | 12/1994 | Chou .......................... 219/229 |
| 5,408,071 A | * | 4/1995 | Ragland et al. ............. 219/530 |
| 5,422,640 A | | 6/1995 | Haley |
| 5,502,967 A | * | 4/1996 | Nakagawa et al. ........... 62/3.3 |
| 5,529,501 A | * | 6/1996 | Maruyama .................. 434/408 |
| 6,060,693 A | | 5/2000 | Brown |
| 6,225,988 B1 | * | 5/2001 | Robb ......................... 345/179 |
| 6,239,410 B1 | | 5/2001 | Tackore |
| 6,249,277 B1 | * | 6/2001 | Varveris ...................... 345/179 |
| 6,344,795 B1 | | 2/2002 | Gehlot |

FOREIGN PATENT DOCUMENTS

DE     2922620     * 12/1980

* cited by examiner

Primary Examiner—John A. Jeffery

(57) ABSTRACT

Representative embodiments provide for a prosthetic device, including a pointer region, an electrically conductive touch pad supported by the pointer region and configured for selectively contacting a touch-screen display, and an electric heating circuit which is configured to selectively heat the electrically conductive touch pad in response to an actuation of a switch. Also provided is a method for using a prosthetic device including using prosthesis of a user to support at least a portion of the prosthetic device that includes an electrically conductive touch pad, warming the electrically conductive touch pad in response to a user input to the prosthetic device, and selectively contacting the touch-screen display using the electrically conductive touch pad in response to a user manipulation of the prosthetic device.

20 Claims, 3 Drawing Sheets

PROSTHETIC DEVICE FOR USE WITH TOUCH-SCREEN DISPLAYS

BACKGROUND

Various types of touch-screen displays are known in the art. Typically, a touch-screen display is electrically coupled to a computer or other host electronic device that generates images to be shown on the display. Some of these displayed images can be in the form of different kinds of user controls, such as, for example, buttons, slider bars, pull-down menus, etc. These controls are operable through user contact with the particular image, such as, for example, making finger contact with an image of a button so as to make a computerized menu selection, or to trigger a particular computer-controlled event. In this way, touch-screen displays generally provide an image based, two-way interface between a host electronic device and a human user.

Each of the various kinds of touch-screen display is capable of detecting contact by an associated number of different entities. For example, some kinds of touch-screen display, generically referred to as resistive type, can detect contact by nearly any reasonably blunt object that makes contact or relatively light force with the display; non-limiting examples of such an object include a human finger tip, a pencil eraser, a blunt end of ball-point pen, or a plastic stylus designed for routine contact with the resistive type touch-screen display.

Another kind of touch-screen display, generically referred to as capacitive type, requires that the object contacting the display be at least partially electrically conductive so as to detect the contact. A human finger tip, for example, satisfies this requirement of capacitive type touch-screen displays. Other contact-object requirements are associated with other kinds of touch-screen display. Generally speaking, a living human digit is satisfactorily usable with a substantial number of different types of touch-screen display.

The contact-object requirements of some kinds of touch-screen display present an undesirable usage barrier to persons with prosthetic limbs or other physical assistance. With increasing frequency, the kind of touch-screen display that such a person encounters in public, in a professional environment, or other location, is not compatible with prosthesis that they are dependent upon.

Therefore, it is desirable to provide a prosthetic device usable by persons with prosthesis that is compatible with a substantial number of kinds of touch-screen display.

SUMMARY

One embodiment provides for a prosthetic device including a pointer region, and an electrically conductive touch pad that is supported by the pointer region. The electrically conductive touch pad is configured for selectively contacting a touch-screen display. The prosthetic device also includes an electric heating circuit including a switch, wherein the electric heating circuit is configured to selectively heat the electrically conductive touch pad in response to an actuation of the switch.

Another embodiment provides for a prosthetic device for use with a touch-screen display, including a graspable body configured to be graspably supported by a prosthesis of a user, and a pointer region supported by the graspable body. The prosthetic device also includes an electrically conductive touch pad supported by the pointer region, which is configured to selectively contact the touch screen display in response to a user manipulation of the prosthetic device. The prosthetic device further includes a source of electrical energy, and a heating element that is electrically coupled to the source of electrical energy and is configured to selectively warm the electrically conductive touch pad.

Still another embodiment provides for a prosthetic device for use with a touch-screen display, including a sleeve configured to receive and be supported by prosthesis of a user. The prosthetic device also includes a pointer region supported by the sleeve, and an electrically conductive touch pad supported by the pointer region, which is configured to selectively contact the touch-screen display in response to a user manipulation of the prosthetic device. The prosthetic device further includes a source of electrical energy, and a heating element electrically coupled to the source of electrical energy that is configured to selectively warm the electrically conductive touch pad.

Yet another embodiment provides for a prosthetic device for use with a touch-screen display, including means for supporting at least a portion of the prosthetic device using prosthesis of a user, and an electrically conductive means configured to selectively contact the touch screen display in response to a user manipulation of the prosthetic device. The prosthetic device further includes electrical heating means configured to selectively warm the electrically conductive means in response to a user input to the prosthetic device.

Still another embodiment provides a method for using a prosthetic device with a touch-screen display, including supporting at least a portion of the prosthetic device using prosthesis of a user, and supporting an electrically conductive touch pad using a pointer region of the prosthetic device. The method also includes warming the electrically conductive touch pad in response to a user input to the prosthetic device, and selectively contacting the touch-screen display using the electrically conductive touch pad in response to a user manipulation of the prosthetic device.

These and other aspects and embodiments will now be described in detail with reference to the accompanying drawings, wherein:

DETAILED DESCRIPTION

In representative embodiments, the present teachings provide methods and apparatus for a prosthetic device that is usable in conjunction with various kinds of touch-screen display. The prosthetic device of the present invention is supportable by prosthesis of a user, and can be readily manipulated by such a user so as to make use of touchscreen displays typically found in a number of applications. Non-limiting examples of such applications include an automatic teller machine (ATM) at a bank, a computerized menu for selecting foods or other goods at a retail vendor, an information kiosk at an airport or railroad station, etc.

Figure 1:
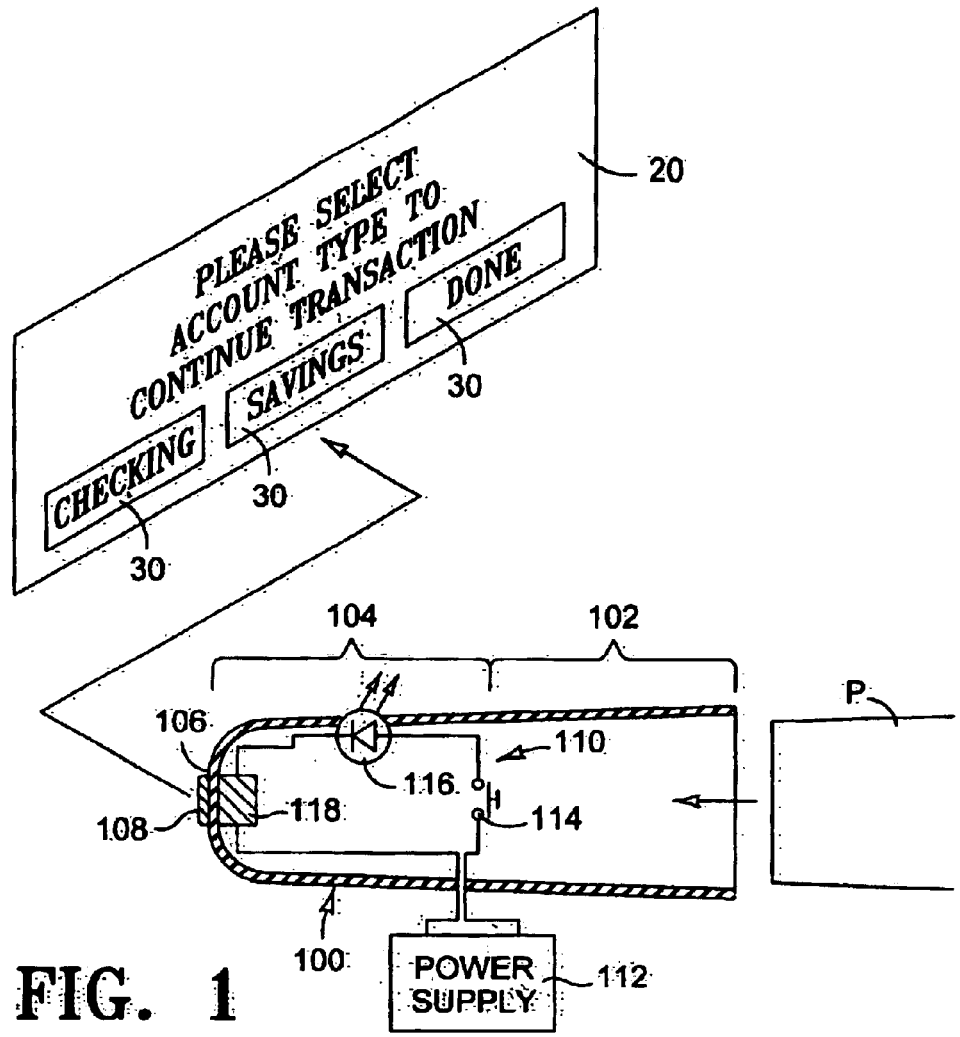
FIG. 1 is a side elevation sectional view depicting a prosthetic device in accordance with an embodiment of the present invention.

Turning now to FIG. 1, a side elevation sectional view depicts a prosthetic device 100 in accordance with one embodiment of the present invention. The prosthetic device 100 includes a sleeve portion 102. The sleeve portion 102 is configured to slidingly receive a prosthesis P of a user. The sleeve portion 102 can be formed of neoprene, leather, synthetic or natural rubber material, or any other suitable material that is of sufficient thickness, pliability and surface friction as to generally constrict about the prosthesis "P" and remain supported thereon during use. Furthermore, the sleeve portion 102 is configured to be readily removable from the prosthesis "P", as desired by a user. In other embodiments (not shown), the prosthetic device 100 can include a magnetic engagement, hook-and-loop material, or other suitable mechanical means so as to be removably supported by the prosthesis "P"of a user.

The prosthetic device 100 further includes a pointer region 104. The pointer region 104 is mechanically coupled to the sleeve portion 102, and is supported thereby during useful engagement with the prosthesis P of a user. The pointer region 104 of the prosthetic device 100 is typically tapered away from the sleeve portion 102 and terminates in a generally blunt Up 106. The pointer region 104 can be formed of the same material as the sleeve 102, so as to define a single-piece entity. Alternatively, the pointer region 104 can be formed of the same or a different material as the sleeve 102, and suitably coupled thereto using cement, stitching, metallic fasteners, etc., or any combination of these or other mechanical joining means.

The prosthetic device 100 also includes an electrically conductive touch pad 108. The electrically conductive touch pad 108 is supported on an outer surface of the blunt tip 106 of the pointer region 104. The electrically conductive touch pad 108 is configured to make selective, non-damaging contact with various exemplary control images 30 of an exemplary touch-screen display 20 under the influence (i.e., manipulation) of the prosthetic device 100 by way of the prosthesis "P" of a user. The electrically conductive touch pad 108 can be formed from any suitable conductive material that is sufficiently pliable or otherwise non-damaging to the exemplary touch-screen display 20.

Those of skill in the electrical arts will appreciate that numerous such materials exist for forming the electrically conductive touch pad 108, such as, for example, polyethylene conductive foam typically used for the storage of integrated circuit devices, which is commercially available from Contact East, Inc., North Andover, Mass. Other suitable materials for forming the electrically conductive touch pad 108 are known.

The prosthetic device 100 also includes an electric heating circuit 110. The electric heating circuit 110 includes a power supply 112. The power supply 112 is configured to provide electrical energy (i.e., electricity) to the balance of the electric heating circuit 110, described hereafter. The power supply 112 can be any suitable source of electrical energy, non-limiting examples of which include a battery or combination of batteries, a direct-current power supply, or a wall-mounted power supply configured to plug into a convenience receptacle (commonly referred to as a "brick"). As shown, the power supply 112 provides direct-current electrical power to the heating circuit 110. However, in another embodiment (not shown), the power supply 114 can provide alternating-current electricity to a corresponding electrical heating circuit 110 of the prosthetic device 100.

The power supply 112 can be further configured and electrically coupled to the balance of the electric heating circuit 110 so as to be remotely located from both the sleeve 102 and the pointer region 104 of the prosthetic device 100. In this way, the power supply 112, which is typically both the bulkiest and the heaviest element within the electric heating circuit 110, is not borne (i.e., supported) by either of the sleeve 102 or pointer region 104, and therefore does not introduce an appreciable weight load upon a user of the prosthetic device 100.

The electric heating circuit 110 can further include a switch 114. The switch 114 is electrically coupled to the power supply 112 and is configured to selectively control the energizing of the electric heating circuit 110 in response to a user actuation of the switch 114. As shown in FIG. 1, the switch 114 is supported within the sleeve 102 and is configured to be actuated, or turned on, by physical contact between the switch 114 and the prosthesis "P" during use of the prosthetic device 100. In another embodiment (not shown), the switch 114 can be configured to be actuated in response to other user manipulation, non-limiting examples of which include pressing a button or toggling lever of the switch 114 with another prosthesis or natural limb of a user, applying user bite pressure to the switch 114 or an associated support of the switch 114, blowing user breath into a tube coupled to the switch 114, etc. In general, any suitable user manipulation or input that results in the selective actuation and/or de-actuation of the switch 114 can be used within the scope of the present invention.

The electric heating circuit 110 can further include an electric light 116. As shown, the electric light 116 is supported by the pointer region 104 and is defined by a light emitting diode (LED). Other kinds of electric light 116, which are satisfactorily supportable by the prosthetic device 100, can be employed. The electric light 116 is configured to provide a user-visible indication of the energized state of the electric heating circuit 110, and in particular, of a heating element 118 described hereafter. As shown, the electric light 116 is illuminated, or on, when the electric heating circuit 110 is energized. Conversely, the electric light 116 is not illuminated, or is off, when the electric heating circuit 110 is not energized. In this way, the state of illumination of the electric light 116 generally corresponds to the actuated or de-actuated state of the switch 114.

The electric heating circuit 110 also includes the heating element 118, introduced above. The heating element 118 is supported by the pointer region 104, and is in thermal communication with the electrically conductive touch pad 108. The heating element 118 is configured to provide heat energy to the electrically conductive touch pad 108 when the electric heating circuit 110 is energized by way of the switch 114. As shown in FIG. 1, the heating element 118 is a resistor. In another embodiment (not shown), the heating element 118 can be another kind of electric device that produces heat energy when energized.

The heating element 118 is selected to provide sufficient heat to warm the electrically conductive touch pad 108 to a temperature generally approximating that of a living human digit (i.e., a finger tip). The exact degree of heating that is provided by the heating element 118 is not critical to the present invention, provided that the electrically conductive touch pad 108 is warmed sufficiently to be usable with any particular touch-screen display (similar to exemplary touch-screen display 20).

It is to be noted that the overall size and shape of the prosthetic device 100 can assume a variety of satisfactory forms. In one embodiment (not shown), the prosthetic device 100 substantially approximates the size and shape of an extended human digit. Other size and shape combinations (not shown) can be used. Generally, the prosthetic device 100 can be defined by any size and shape combination that is usefully cooperative with a particular prosthesis P of a user and a particular touch-screen display (such as exemplary display 20).

Further more, the electric heating circuit 110 can be configured to be supported at least in part by the sleeve 102 and/or pointer region 104 of the prosthetic device 100, or the bulk of the electrical heating circuit 110 can be supported by another entity (not shown). For example, in another embodiment (not shown), the power supply 112, the switch 114, and the electric light 116 can be supported by a housing that is configured to rest on a table top, with only the heating element 118 supported by the pointer region 104 and electrically coupled to the balance of the heating circuit 110 by way of suitable runs of electric wire. Other forms of the electrical heating circuit 110 can be used.

Figure 2:
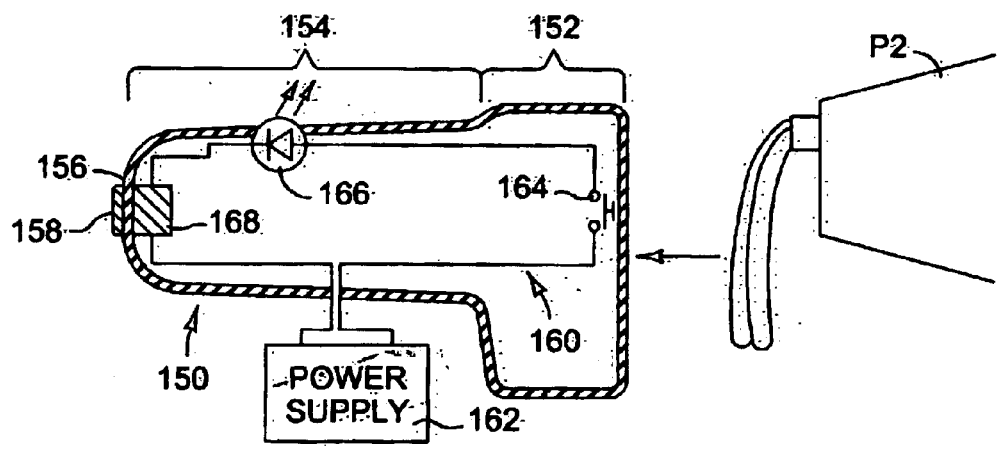
FIG. 2 is a side elevation sectional view depicting a prosthetic device in accordance with another embodiment of the present invention.

FIG. 2 is a side elevation sectional view depicting a prosthetic device 150 in accordance with another embodiment of the present invention. The prosthetic device 150 further includes a graspable body, or region, 152. The graspable body 152 is configured to be graspably supported (that is, grasped or gripped) by prosthesis "P2" of a user. As shown in FIG. 2, the graspable body 152 can be defined by a generally rectangular cross-section, and is constructed to be slightly deformed during graspable support by the prosthesis P2 of a user. The graspable body 152 can be formed of natural or synthetic rubber, silicon material, or any other suitable material that can be readily grasped by the prosthesis "P2" (or a similar prosthesis, not shown) of a user. Furthermore, the graspable body 152 can be substantially hollow or substantially solid, as is desired and compatible with the balance of the prosthetic device 150 described hereafter.

The prosthetic device 150 includes pointer region 154. The pointer region 154 is mechanically coupled to the graspable body 152 and is configured to be supported thereby during user operation of the prosthetic device 150. The pointer region 154 is generally tapered away from the graspable body 152 and terminates in a blunt tip 156. The pointer region 154 and the graspable body 152 can be formed together of the same material as a single-piece entity. In an alternative configuration, the pointer region 154 can be formed of the same or a different material as the graspable body 152 and mechanically coupled thereto by any suitable means, including, for example, those described above in regard to the prosthetic device 100 of FIG. 1.

The prosthetic device 150 also includes an electrically conductive touch pad 158 supported on an outer surface of the blunt tip 156 of the pointer region 154. The electrically conductive touch pad 158 is substantially defined and configured as described above in regard to the electrically conductive touch pad 108 of the prosthetic device 100 of FIG. 1.

The prosthetic device 150 further includes an electric heating circuit 160. The electric heating circuit 160 includes a power supply 162, an electric light 166, and a heating element 168, which are substantially defined, configured, and cooperative as described above for the power supply 112, the electric light 116, and the heating element 168, respectively, of the prosthetic device 100 of FIG. 1. It will be noted that the electric light 166 of the prosthetic device 150 can be optionally provided. Furthermore, the electric heating circuit 160 can include a switch 164 that is configured to selectively energize the electric heating circuit 160 in response to a user actuation of the switch 164. As depicted in FIG. 2, the switch 164 is configured to be actuated in response to supporting of the graspable body 152 by the user prosthesis "P2" during use of the prosthetic device 150. In another embodiment (not shown), the switch 164 can be configured to be selectively actuated and de-actuated by any suitable user manipulation or input, examples of which were provided above with respect to switch 114 of FIG. 1

The particular form of the prosthetic device 150 of FIG. 2 can vary within the scope of the present invention. For example, the graspable body 152 can be formed in the general shape of a sphere, an ellipsoid, an egg-shaped entity, or any other physical form that is suitable for grasping by any particular user prosthesis "P2" (none shown, respectively). In addition, the graspable body 152 can be formed of any material that provides a textured or otherwise non-slip outer surface (such as, for example, some types of generally tacky silicon that are known by those of skill in the art), provided that the particular material of the graspable body 152 is suitable in view of the other characteristics of the prosthetic device 150.

Figure 3:
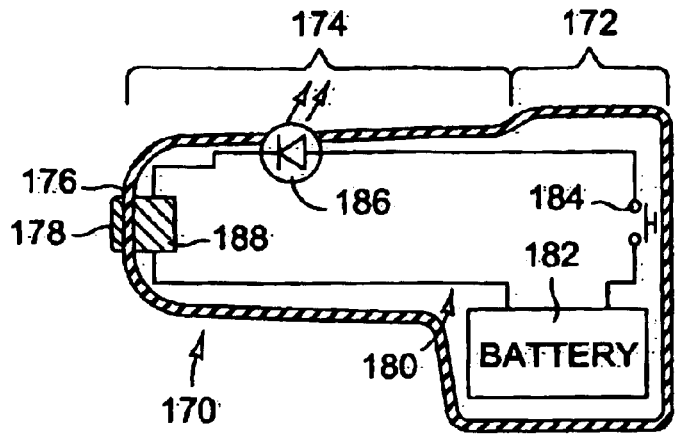
FIG. 3 is a side elevation sectional view depicting a prosthetic device in accordance with still another embodiment of the present invention.

FIG. 3 is a side elevation sectional view depicting a prosthetic device 170 in accordance with still another embodiment of the present invention. The prosthetic device 170 includes graspable body 172, a pointer region 174, a blunt tip 176, and an electrically conductive touch pad 178, each of which is substantially defined, configured, and cooperative as described above in regard to elements 152, 154, 156, and 158, respectively, of the prosthetic device 150 of FIG. 2. Furthermore, the prosthetic device 170 includes an electric heating circuit 180. The electric heating circuit includes a switch 184, an electric light 186, and a heating element 188, each of which is substantially defined, configured, and cooperative as described above in regard to the element 164; 166, and 168, respectively, of the prosthetic device 150 of FIG. 2.

The prosthetic device 170 further includes a battery 182. The battery 182 is incorporated within the electric heating circuit 180, and is configured to provide electrical energy to the circuit 180 in accordance to the actuation state of the switch 184. The graspable body 172 is configured to house and support the battery 180. In turn, the battery 180 is defined by an overall physical size that permits such a supporting arrangement within the graspable body 172. In this way, the prosthetic device 170 has an overall configuration that is self-contained and readily portable, without the need to rely upon an external source of electrical energy such as, for example, a convenience receptacle in which to plug a power supply such as the power supply 162 of FIG. 2. Therefore, the prosthetic device 170 of the present invention lends itself well to use in public places (such as, for example, an ATM of a bank) and is easily transportable from place to place.

The graspable body 172 is further configured to facilitate the removal and replacement of the battery 180 as required, over the usable life of the prosthetic device 170. Such a configuration of the graspable body 172 can include, for example, a slit or open seam (not shown) that is opened under squeezing pressure applied by a user, an operable hatch or cover (not shown), etc., so as to permit replacement of the battery 180. Those of skill in the related arts are aware of a number of satisfactory configurations that permit the removal and replacement of a battery or batteries within portable equipment, and a number of these configurations can be applied to the prosthetic device 170.

The graspable body 172 can be made from any material and can assume any particular form that is consistent with the overall configuration and operation of the prosthetic device 170, including, for example, at least some of the materials and forms described above in regard to the prosthetic device 150 of FIG. 2.

Figure 4:
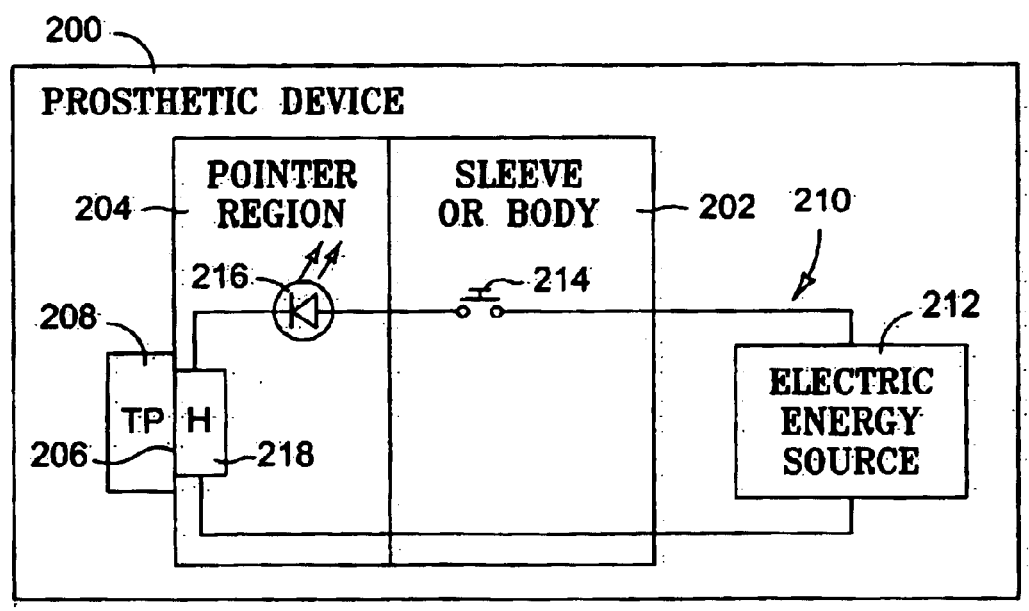
FIG. 4 is a block schematic diagram depicting a prosthetic device in accordance with a generic embodiment of the present invention.

FIG. 4 is a block schematic of a prosthetic device 200 that is generic to certain embodiments of the present invention described herein. The prosthetic device 200 includes a sleeve or graspable body portion 202 that is selectively supportable by a prosthesis (not shown) of a user. The prosthetic device 200 also includes a pointer region 204, which is mechanically coupled to, or continuously formed with, the sleeve or body portion 202 of the prosthetic device 200. Support of the sleeve or body portion 202 by a user prosthesis (not shown) in turn supports the pointer region 204.

The pointer region 204 includes a generally blunt tip 206. The prosthetic device 200 further includes an electrically conductive touch pad 208 that is supported on an outer surface of the pointer region 204. The electrically conductive touch pad 208 is used to cooperatively contact a touch-screen display (not shown; see FIG. 1) in response to a user manipulation of the prosthetic device 200 by way of a user prosthesis (not shown).

The prosthetic device 200 further includes an electric heating circuit 210. The electric heating circuit 210 includes an electric energy source 212, a switch 214, an electric light 216, and a heating element 218, respectively configured as a series circuit. The electric energy source 212 and the switch 214 are cooperatively configured to selectively energize (i.e., provide electrical energy to) the electric heating circuit 210 in response to a user actuation of the switch 214. The electric light 216, shown by example in the form of an LED, is configured to provide a visible indication of the energized state of the electric heating circuit 210, in correspondence to the actuation state of the switch 214. The heating element 218 is configured to provide heat energy to the electrically conductive touch pad 206 when the electric heating circuit 210 is energized.

In another embodiment (not shown) of the present invention, the electric light 216 is omitted and a direct electrical connection exists between the switch 214 and the heating element 218. Therefore, it is to be understood that the electric light 216 is considered an optional element within the context of the present invention. As shown, the electric light 216 and the heating element 218 form a series circuit path within the electric heating circuit 210. In another embodiment (not shown), the electric light 216 and the heating element 218 can be configured as elements in respectively different parallel circuit paths of the electric heating circuit 210. Other embodiments of the electric heating circuit 210 (not shown) can be used.

The prosthetic device 200 is depicted as supporting the switch 214 within the sleeve or body 202, and the electric light 216 within the pointer region 204. However, it is to be further understood that other supportive configurations of the electric heating circuit 210 can also be used, provided that the overall configuration of the electric heating circuit 210 is such that the heating element 218 provides heat energy to the electrically conductive touch pad 208 in response to a user actuation of the switch 214.

The overall form and constituency of a particular embodiment of the prosthetic device 200 is not crucial to the present invention, so long as it substantially satisfies the description provided above. For example, a particular embodiment of the prosthetic device 200 can be made fully self-contained and portable through the selection of a battery to define the electric energy source 212, or an embodiment can be designed primarily for use at a substantially fixed location through the use of a power supply to define the electric energy source 212. Other variations of the prosthetic device 200, within the context of the present invention, can also be used.

Generally, the prosthetic device 200 provides an embodiment of the present invention that is usage-compatible with a substantial number of different kinds of touch-screen display, through the provision of the electrically conductive touch pad 208 and the electric heater circuit 210. The electric heater circuit 210 provides warmth (i.e., heat energy) to the electrically conductive touch pad 208, so as to substantially approximate the surface temperature of a living human finger tip. This configuration of a generally warm, blunt (i.e., non-damaging), electrically conductive touch pad 208 results in a prosthetic device 200 that will generally satisfy the contact-object requirements of a substantial number of different kinds of touch-screen displays.

Figure 5:
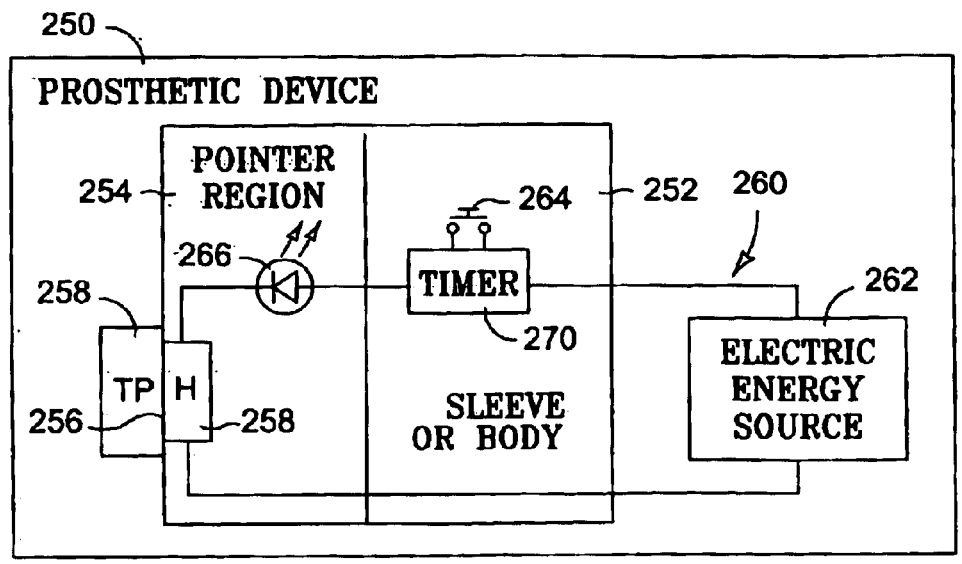
FIG. 5 is a block schematic diagram depicting a prosthetic device in accordance with another generic embodiment of the present invention.

FIG. 5 is a block schematic diagram of a prosthetic device 250 in accordance with another embodiment of the present invention. The prosthetic device 250 includes a sleeve or graspable body portion 252, a pointer region 254, a blunt tip 256, and an electrically conductive touch pad 258 that are defined, configured, and cooperative substantially as described above in regard to the elements 202, 204, 206 and 208, respectively, of the prosthetic device 200 of FIG. 4. The prosthetic device 250 also includes an electric heating circuit 260. The electric heating circuit 260 includes an electrical energy source 262, an electric light 266, and a heating element 268 that are defined, configured, and cooperative substantially as described above in regard to the elements 212, 216, and 218, respectively, of the prosthetic device 200 of FIG. 4. The electric heating circuit 260 also includes a timer 270 and a switch 264. The timer 270 is configured to energize the electric heating circuit for a predetermined period of time, in response to a user actuation of the switch 264.

The electric heating circuit 260 can be configured such that the user actuation of the switch 264 occurs in response to, for example, supporting the prosthetic device by way of a user prosthesis (not shown), direct user manipulation of a button or lever (neither shown) of the switch 264, etc. The timer 270 can also be configured to permit a user to selectively reset, or restart, the predetermined period of time during use of the prosthetic device 250, thereby permitting ongoing operation of the prosthetic device 250 with no discontinuity in the energized state of the electric heating circuit 260. Furthermore, the timer 270 can be configured to permit selective user adjustment of the predetermined period of time.

In this way, the electric heating circuit 260 can be configured to automatically assume a de-energized state at the end of the predetermined period of time, under the control of the timer 270. This permits, for example, a user to energize the electric heating circuit 260 for a relatively brief usage of a portable embodiment of the prosthetic device 250, say, during an operation at a touch-screen display of an ATM (see FIG. 1), and then store the prosthetic device 250 in a carry location (such as, for example, a purse or a pocket of a coat), without requiring the user to expressly de-energize the electric heating circuit 260.

Figure 6:
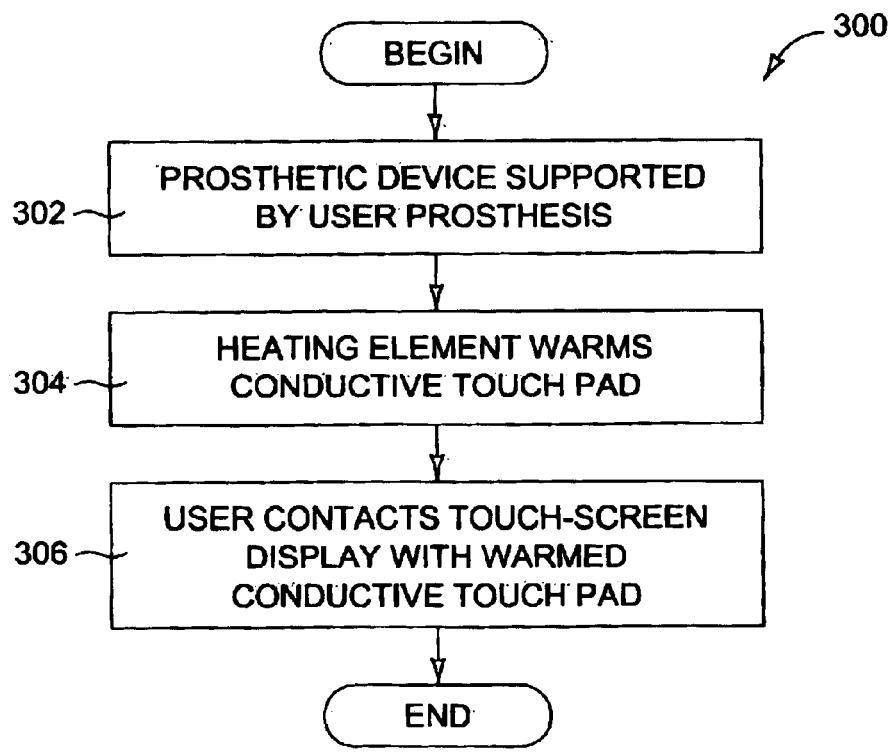
FIG. 6 is a flowchart depicting a method of using a prosthetic device in accordance with the present invention.

FIG. 6 is a flowchart depicting a method 300 of using a prosthetic device in accordance with the present invention. For clarity of understanding, the method 300 shall be described within the context of the generic prosthetic device 200 (see FIG. 4) of the present invention. However, it is to be understood that the method 300 is not intended to limited by any of the apparatus depicted in FIGS. 1 through 5.

In step 302 of flowchart 300, the prosthetic device 200 (FIG. 4) is supported by prosthesis of a user (not shown) in, preparation for using the prosthetic device 200 with a touch-screen display (not shown; see FIG. 1). In step 304 (FIG. 6), a user actuates the switch 214 (FIG. 4) of the prosthetic device 200, which in turn energizes the electric heating circuit 210, causing the heating element 218 to warm the electrically conductive touch pad 208. In step 306 (FIG. 6), a user selectively contacts one or more various locations on a touch-screen display 20 (FIG. 1), as desired, using the touch pad 208 (FIG. 4) of the prosthetic device 200. The user can continue the activity of step 306 (FIG. 6) as desired, or can de-energize the electric heating circuit 210 (FIG. 4) and discontinue support and/or use of the prosthetic device 200.

In another method (not shown), a user can select to skip step 304 (FIG. 6), and to use the electrically conductive touch pad 108 (FIG. 1) in a non-warmed condition. This option can be selected, for example, if a particular touch-screen display does not require a relatively warm contact-object for normal operation.

Thus, an apparatus and method for use with touch-screen displays has been provided. Embodiments of the present invention are respectively configured for supportive use by persons having prosthesis, and approximate those characteristics of a living human digit that are generally required for operation of a substantial number of different kinds of touch-screen display.

I claim:

1. A prosthetic device, comprising:
   a pointer region;
   an electrically conductive touch pad supported by the pointer region and configured for selectively contacting a touch-screen display;
   an electric heating circuit including a switch, wherein the electric heating circuit is configured to selectively heat the electrically conductive touch pad in response to an actuation of the switch; and
   a sleeve supporting the pointer region, and wherein the sleeve is configured to be receivably supported by a prosthesis of a user.

2. The prosthetic device of claim 1, and wherein the switch is configured to be actuated during the receivable support by the prosthesis of a user.

3. A prosthetic device for use with a touch-screen display, comprising:
   a sleeve configured to be receivably supported by a prosthesis of a user;
   a pointer region supported by the sleeve;
   an electrically conductive touch pad supported by the pointer region and configured to selectively contact the touch-screen display in response to a user manipulation of the prosthetic device;
   a source of electrical energy; and
   a heating element electrically coupled to the source of electrical energy and configured to selectively warm the electrically conductive touch pad.

4. The prosthetic device of claim 3, and further comprising an electric light configured to visibly indicate an energized state of the heating element.

5. The prosthetic device of claim 3, and further comprising a switch configured to selectively energize the heating element in response to an actuation of the switch.

6. The prosthetic device of claim 5, and wherein the switch is further configured such that the actuation occurs in response to the receivable supporting the sleeve by the prosthesis of a user.

7. The prosthetic device of claim 3, and wherein the sleeve is defined by at least one of a friction-fit entity, a magnetic engagement entity, a mechanical engagement entity, or a constrictive engagement entity.

8. The prosthetic device of claim 3, and wherein the source of electrical energy is defined by a power supply.

9. The prosthetic device of claim 3, and wherein the source of electrical energy is defined by a battery.

10. The prosthetic device of claim 3, and wherein the heating element is defined by a resistor.

11. The prosthetic device of claim 3, and further comprising a switch and a timer, wherein the timer is configured to selectively energize the heating element for a predetermined period of time in response to an actuation of the switch.

12. The prosthetic device of claim 11, and wherein the timer is further configured such that the predetermined period of time is selectively adjustable by a user.

13. The prosthetic device of claim 3, and wherein the sleeve is formed of a pliable material, and wherein the sleeve is further configured to conform to an outer surface contour of the prosthesis of a user during the receivable support.

14. The prosthetic device of claim 3, and wherein the sleeve and the pointer region are formed of the same material and are defined by a continuous single-piece entity.

15. A prosthetic device for use with a touch-screen display, comprising:
   means for supporting at least a portion of the prosthetic device using a prosthesis of a user;
   electrically conductive means configured to selectively contact the touch screen display in response to a user manipulation of the prosthetic device; and
   electrical heating means configured to selectively warm the electrically conductive means in response to a user input to the prosthetic device.

16. A method for using a prosthetic device with a touch-screen display, comprising:
   supporting at least a portion of the prosthetic device using a prosthesis of a user;
   supporting an electrically conductive touch pad using a pointer region of the prosthetic device;
   warming the electrically conductive touch pad in response to a user input to the prosthetic device using an electric heating circuit of the prosthetic device; and
   selectively contacting the touch-screen display using the electrically conductive touch pad in response to a user manipulation of the prosthetic device.

17. The method of claim 16, and further comprising visibly indicating that the touch pad is being warmed.

18. The method of claim 16, and further comprising warming the electrically conductive touch pad for a predetermined period of time, and wherein the period of time begins in response to the user input to the prosthetic device.

19. The method of claim 18, and wherein the supporting the at least a portion of the prosthetic device is further defined by graspably supporting the at least a portion of the prosthetic device using the prosthesis of a user.

20. The method of claim 16, and wherein the supporting the at least a portion of the prosthetic device is further defined by receivably supporting the at least a portion of the prosthetic device using the prosthesis of a user.

* * * * *

UNITED STATES PATENT AND TRADEMARK OFFICE
CERTIFICATE OF CORRECTION

PATENT NO. : 6,794,609 B2
DATED : September 21, 2004
INVENTOR(S) : Loren Mart

It is certified that error appears in the above-identified patent and that said Letters Patent is hereby corrected as shown below:

Column 3,
Line 29, after "blunt", delete "Up" and insert therefor -- tip --.

Signed and Sealed this

Twelfth Day of April, 2005

JON W. DUDAS
*Director of the United States Patent and Trademark Office*